J. W. POWERS.
Vessel for Setting Milk.

No. 203,852.   Patented May 21, 1878.

Attest:
F. H. Schott
J. C. Jones

Inventor:
Jay W. Powers

UNITED STATES PATENT OFFICE.

JAY W. POWERS, OF PORTAGE, WISCONSIN, ASSIGNOR OF TWO-THIRDS HIS RIGHT TO E. S. PURDY AND A. H. ARMOR, OF SAME PLACE.

IMPROVEMENT IN VESSELS FOR SETTING MILK.

Specification forming part of Letters Patent No. 203,852, dated May 21, 1878; application filed March 12, 1878.

*To all whom it may concern:*

Be it known that I, JAY W. POWERS, of Portage, county of Columbia, and State of Wisconsin, have invented certain new and useful Improvements in a Device or Apparatus for Separating Cream from Milk; and I do hereby declare that the following is a full, clear, and exact description of the same, reference being had to the accompanying drawings, forming a part of this specification, in which—

Figure 1:
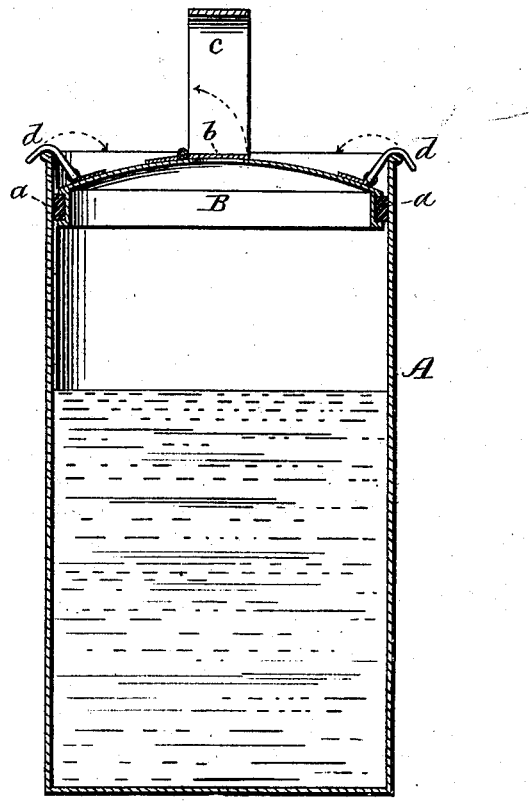
Figure 2:
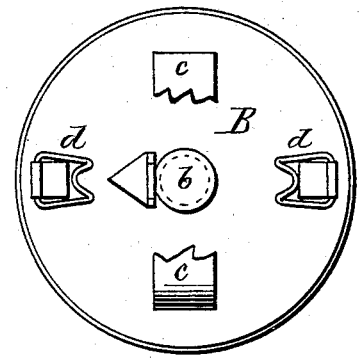

Figure 1 is a vertical section thereof, and Fig. 2 a top-plan view of the piston.

The object or purpose of the present invention is to construct a simple and effective means for separating the cream from milk, by creating a partial vacuum within the vessel containing the milk, whereby the cream may be removed quickly and thoroughly without the necessity of requiring the milk to stand for a long time for the cream to rise, as has been generally the custom.

The invention therefore consists in a piston fitting within a vessel or receptacle for holding the milk, said piston being provided with a suitable valve, whereby a vacuum or partial vacuum is formed in the vessel between the surface of the milk and piston, as will be hereinafter described.

In the accompanying drawings, A represents a vessel of any suitable form or construction, and of any suitable material, but preferably of tin or sheet metal, and, if desired, may be provided with handles for raising or lifting the same.

Fitting within the vessel A is a piston, B, of wood, metal, or other suitable material from which pistons are generally made. The piston B has secured around its rim or outer periphery a packing, *a*, so that said piston will be perfectly air-tight when fitted within the vessel A. The piston is provided with an automatic valve, *b*, and a suitable handle, *c*, for operating the piston, also pivoted or hinged hooks *d*, which engage with the rim of the vessel A, to support the piston in an elevated position above the surface of the milk.

In carrying my invention into operation, milk is first placed in the vessel A, of sufficient quantity to leave a space above the surface thereof to form an air-chamber. The piston B is then placed in the vessel, and forced down to the surface of the milk. The air within the space forcing open the valve *b*, and escaping then by drawing the piston upward, the atmosphere above the piston closes the valve, thus producing a vacuum or partial vacuum in the space between the surface of the milk and the piston.

After the vacuum is created the piston is secured at the top of the vessel by the hooks *d*, thereby preventing it from again being forced down to the milk by the atmospheric pressure upon it.

The piston B, being nearly equal in circumference to the interior circumference of the vessel A, produces the desired vacuum by a single downward and upward thrust or stroke, and it also serves as a cover to keep the cream under the influence of the vacuum, and preserve it sweet until a sufficient quantity has accumulated to make a churning, thus obviating the necessity of churning the cream at a certain age regardless of the quantity on hand, and the milk from which the cream has been extracted through means of a vacuum is rendered far superior for cheese-making purposes, as no acidity has taken place therein.

A very important advantage of the cream when produced by vacuum, as hereinbefore described, is the easy manner in which it may be churned, as the butter-globules have not become toughened by exposure to the air, and the butter produced is of uniform quality, so that in packing it there is no perceptible difference in the various churnings of the butter, thereby increasing its market value, as well as lessening the labor of the dairy, insuring perfect cleanliness, excluding all foul odors and gases from permeating the milk or cream, thereby securing a perfectly pure and wholesome article of food.

The vessel for containing the milk may be provided, if desired, with an opening at its bottom for withdrawing the milk after the cream has been formed thereon, said opening being closed by a suitable plug; or a faucet may be employed for controlling the discharge-opening at the bottom of the vessel.

Having now fully described the construction and operation of my invention, what I claim as new, and desire to secure by Letters Patent, is—

The combination, with a vessel for setting milk, of a piston fitting air-tight in said vessel, and having an aperture through it covered by a valve opening outward, substantially as and for the purpose specified.

JAY W. POWERS.

Witnesses:
WM. H. CHASE,
A. PELLETIER.